Figure 12:
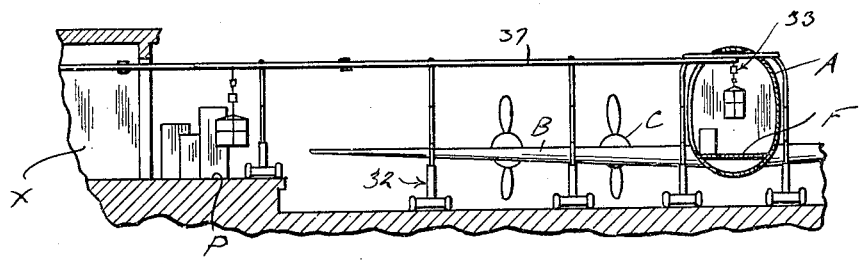

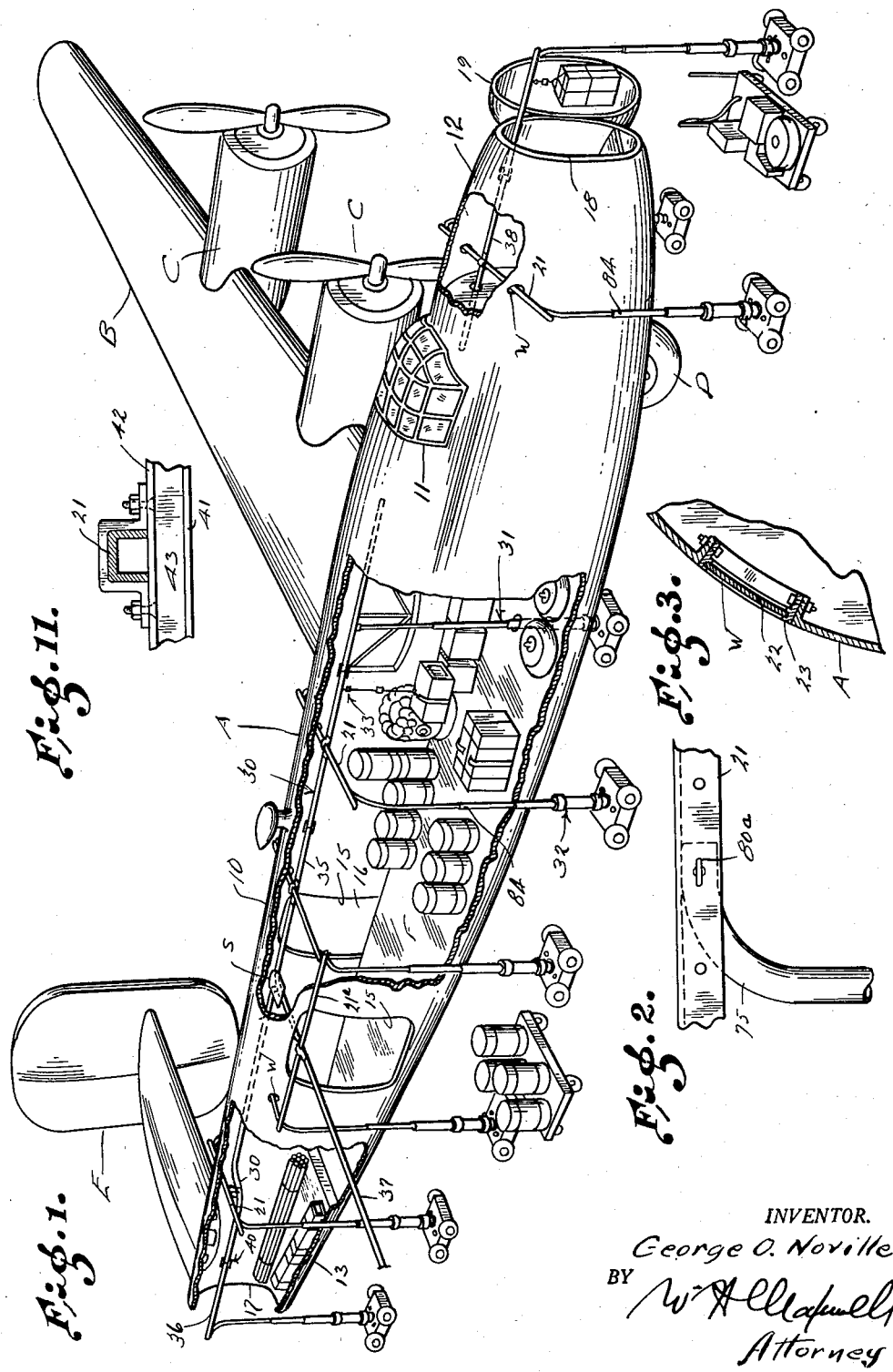

Feb. 28, 1950 G. O. NOVILLE 2,498,819
APPARATUS FOR HANDLING AIRCRAFT CARGO
Filed May 20, 1944 3 Sheets-Sheet 2

INVENTOR.
George O. Noville
BY
Attorney

Feb. 28, 1950        G. O. NOVILLE        2,498,819
APPARATUS FOR HANDLING AIRCRAFT CARGO

Filed May 20, 1944        3 Sheets-Sheet 3

INVENTOR.
George O. Noville
BY
W. H. Clapwell
Attorney

Patented Feb. 28, 1950

2,498,819

UNITED STATES PATENT OFFICE 2,498,819

APPARATUS FOR HANDLING AIRCRAFT CARGO

George O. Noville, Van Nuys, Calif., assignor to Great American Universal Aircraft Loading Service, Los Angeles, Calif., a corporation of California Application May 20, 1944, Serial No. 536,647

7 Claims. (Cl. 244—137)

1

This invention has to do with apparatus for handling aircraft cargo and it is a general object of the invention to provide simplified and improved apparatus or equipment whereby the handling of aircraft cargo is greatly simplified and expedited.

It is a general object of my present invention to provide improved apparatus for carrying out the method of cargo handling that is set forth and claimed in my co-pending application entitled "Method and apparatus for handling aircraft cargo," Serial No. 536,648, filed on even date herewith, now Patent No. 2,441,367.

It is an object of the present invention to provide apparatus for use in connection with aircraft such as cargo carrying aeroplanes operable to convey cargo into and out of such aircraft without requiring any special construction or equipment in or on the aircraft itself.

Another object of the invention is to provide equipment of the general character hereinabove referred to that can be very easily and quickly handled, that is, assembled in connection with an aeroplane or dismantled from an aeroplane. The apparatus provided by my present invention is entirely portable, the several units being supported on wheeled carriages or platforms that can be readily shifted from place to place, and which are small enough so that they can be handled quickly and with very little effort.

Another object of the invention is to provide equipment or apparatus of the character referred to which is simplified and compact. The apparatus of the present invention when in use does not project from or encumber the aircraft in a manner to be undesirable or inconvenient and the invention can be carried out without the application of parts or units of the equipment to portions of the aircraft that are inaccessible or inconvenient to reach.

It is another object of my present invention to provide an alarm in connection with apparatus of the general character mentioned which alarm serves to give warning when the aircraft shifts a predetermined amount relative to fixed parts of the apparatus as it is loaded or unloaded.

The various objects and features of my invention will be fully understood from the following detailed description of a typical, preferred form and application of the invention, throughout which description reference is made to the accompanying drawings, in which:

Fig. 1 is a perspective view of a typical or conventional type of cargo carrying aeroplane showing the apparatus of the present invention related

Figure 4:
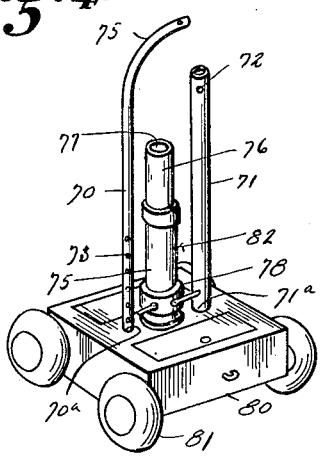
Figure 5:
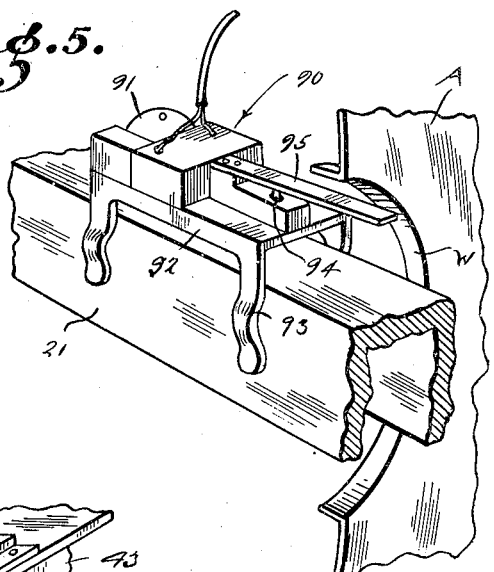
Figure 6:
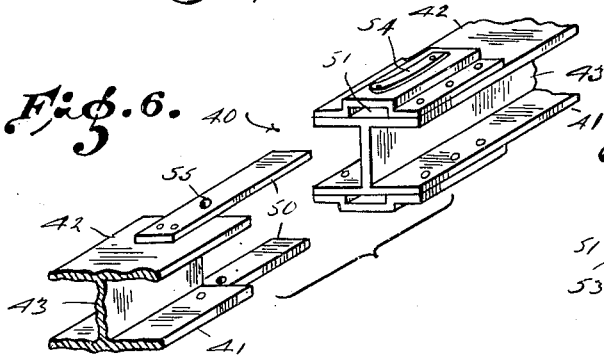
Figure 7:
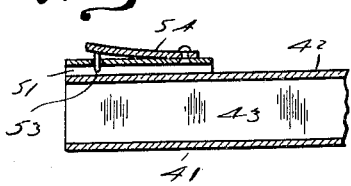
Figure 10:
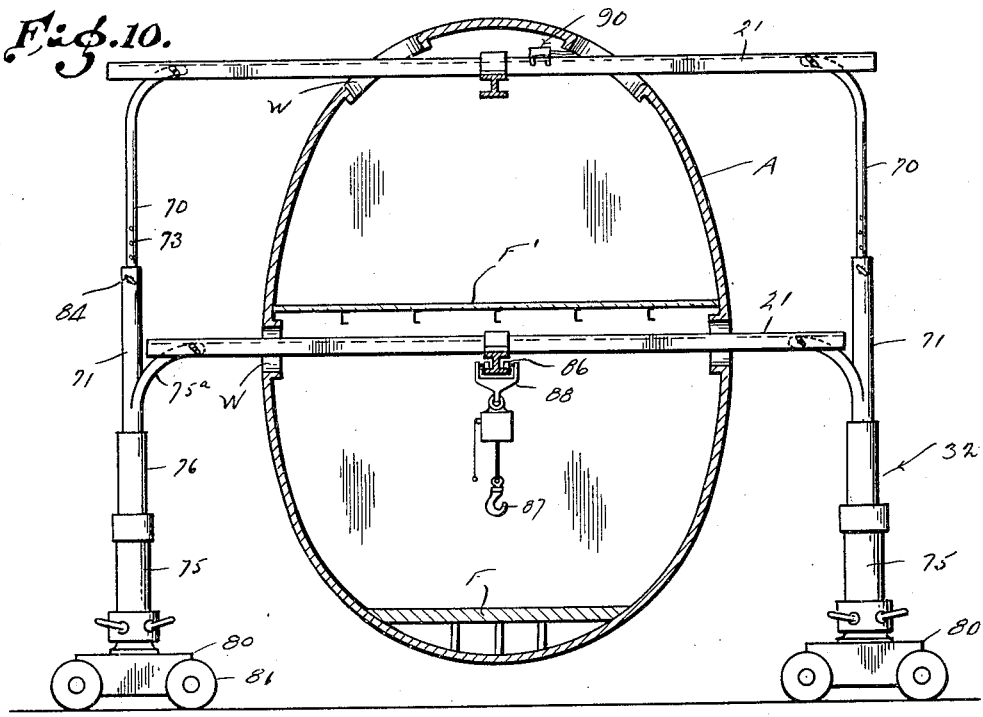
Figure 9:
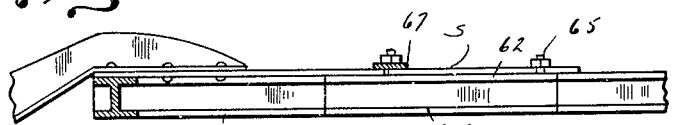
Figure 8:
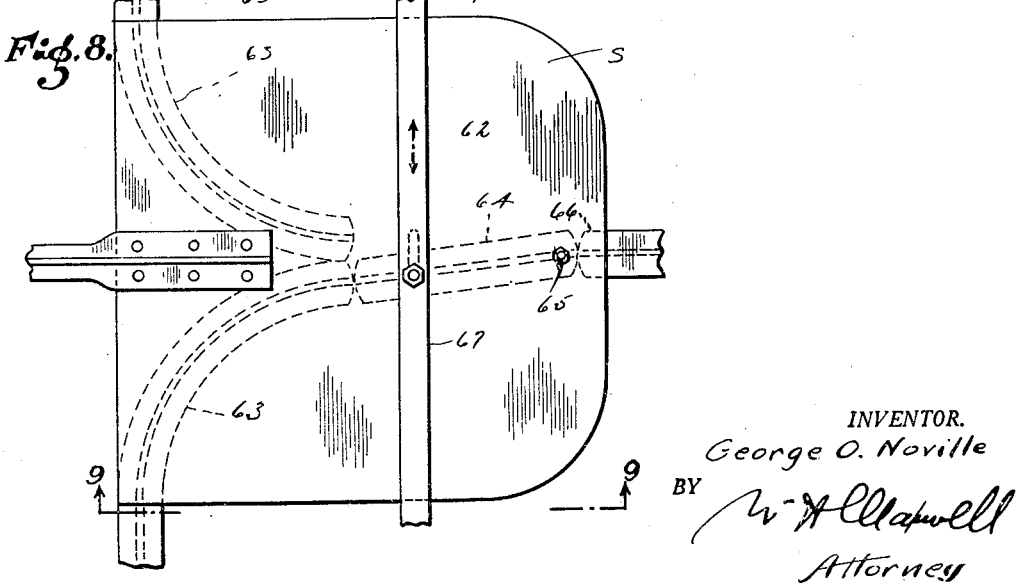

2 thereto for handling cargo, parts of the aeroplane being broken away to facilitate the illustration. Fig. 2 is an enlarged side elevation taken at the upper end of one of the supporting standards showing the manner in which the head of the standard may be connected with the cross-arm of the apparatus. Fig. 3 is an enlarged sectional view taken through one of the windows, or like openings, provided in the fuselage of the aircraft. Fig. 4 is a perspective view illustrating one of the standards provided by the present invention showing it out of operation or in condition to be conveniently moved from place to place or stored when not in use. Fig. 5 is a perspective view of the alarm provided by the invention. Fig. 6 is a perspective view illustrating adjoining ends of two lengths of rail employed in the apparatus showing the manner in which the rail parts may be connected so that they are effectively joined when in use but are readily detachable when it is desired to take the apparatus apart. Fig. 7 is a detailed sectional view of one of the ends of one of the rail parts showing a latch construction that may be employed for releasably connecting the rail parts together. Fig. 8 is a plan view of a switch construction that may be employed in carrying out the invention. Fig. 9 is a side view of the parts shown in Fig. 8, being a view taken on line 9—9 in Fig. 8. Fig. 10 is a view showing my invention applied to an aeroplane construction in which there is more than one deck or cargo carrying level. Fig. 11 is a detailed view showing a connection for supporting a rail. Fig. 12 is a somewhat diagrammatic view showing the apparatus of the present invention connecting an aircraft such as is shown in Fig. 1 with a loading platform and warehouse so that cargo can be moved between these locations and the aircraft in a single, continuous operation.

The apparatus provided by my invention is useful generally, to handle cargo to and from the usual forms of cargo-carrying aeroplanes. In the drawings I have illustrated the essential parts of a typical or common form of cargo-carrying aeroplane and have shown such aeroplane in a manner to illustrate the application of my invention thereto. It is to be understood that the invention is not limited to application to or use in connection with any particular aircraft and that it may be varied as circumstances require to adapt it to aircraft of different types and sizes, etc.

The aircraft or aeroplane shown in Fig. 1 involves, generally, an elongate body or fuselage A, wings B projecting from the sides of the fuselage at the forward end portion thereof, power units C for propelling the craft, landing gear D for supporting the craft on the ground, a tail assembly E at the rear end of the fuselage, and various other parts and constructions common to aeroplanes.

The fuselage shown in the drawings being designed for cargo carrying has a main or body portion 10, a pilot's compartment 11 forward of the body, a cargo-carrying nose portion 12 forward of the pilot's compartment, and a cargo-carrying tail portion 13 at the rear of the body 10 where the tail assembly E is located.

The body portion 10 and the tail portion 13 may form one long, continuous cargo-carrying chamber provided with a suitable floor F which is shown stepped along its length as required by the particular aeroplane construction involved. This cargo-carrying compartment is made accessible through one or more side openings or doorways 15. The particular doorways 15 shown in Fig. 1 are located at the rear end portion of the body 10 and are normally closed by suitable closures 16. The rear end portion 13 of the fuselage is shown provided with an opening 17 normally covered by a suitable closure which may be removable as shown in Fig. 1, for the passage of cargo. The nose portion 12 is provided with an opening 18 preferably at its forward end, which opening is normally closed by a suitable cap 19.

In accordance with usual aeroplane construction I show the fuselage 10 provided at suitable points along its length with sight or window openings. The windows are located in the sides of the fuselage and above the middle thereof and the windows in the two sides of the fuselage are located opposite each other. The windows include transparent panels 22 carried in frames 23 detachably secured to the skin construction of the fuselage.

During normal flight the sight openings or windows are closed, as shown in Fig. 3. However, when the plane is grounded and it is desired to use the apparatus of the present invention in connection therewith the frames 23 are removed, thus establishing pairs of openings opposite each other in the two sides of the fuselage at various points along the length of the fuselage, as will be readily understood from an examination of Fig. 1 of the drawings. Since it is not uncommon and, in fact, is desirable to provide sight openings or windows W in the fuselage of an aeroplane such as I have referred to, it is no bother or expense whatever to space such openings and to locate them to work most advantageously with the apparatus I am about to describe.

The apparatus provided by my invention involves, generally, a rail system 30 extending from a point or points exterior of the aeroplane to various points within the cargo-carrying compartments of the aeroplane, standards 31 and 32 and cross-arms 21 for supporting the rail system, one or more load-carrying carriages 33 operable along the rail system and various other parts and features of construction that will be described.

The rail system will, in practice, vary in character and extent, depending upon the class or type of aeroplane being serviced. For example, if large aeroplanes are to be serviced the rail system is made large and heavy, whereas if small or medium-sized planes are to be serviced the rail system can be correspondingly smaller and lighter. In either case, however, the apparatus of the present invention is extremely simple and convenient to handle. It will be apparent that the exact shape and extent of the rail system employed in connection with any particular aircraft will depend upon the shape and extent of the cargo-carrying compartment or compartments of that craft. I contemplate using more or less sections of apparatus and rails of suitable shapes to accommodate or to meet varying conditions of service.

For an aircraft such as I have shown I may provide a main rail 35 arranged longitudinally in the body 10 of the fuselage, a rear rail 36 arranged to extend through the tail portion 13 of the fuselage, a lateral rail 37 arranged to enter the fuselage through one of the doorways 15, and a nose rail 38 arranged to enter the opening 18.

Each of the rail parts or sections above described may be built up or assembled from a plurality of separable rail lengths or parts joined together by coupling means 40 such as I show in Figs. 6 and 7 of the drawings. A suitable connection may be provided between the lateral rail section 37 and the rail sections 35 and 36 so that the carriages 33 can be operated between the lateral rail 37 and either of the other rail sections. I have shown a simple switch S coupling the lateral rail 37 and the rail sections 35 and 36.

The preferred form of the invention provides a monorail system and a typical rail form is that of an I-beam having lower flanges 41, upper flanges 42 and a connecting web 43 between the flanges. The upper flanges serve as means for mounting the rail parts while the lower flanges support the carriage. The coupling means 40 shown for connecting adjoining rail parts may involve tongues 50 projecting beyond the end of one rail part to enter sockets 51 formed by cleats secured to the other rail part. The tongues and cleats are fixed to the rail parts as by welding or the like and the tongues fit the sockets to provide a firm, stable coupling between the rail parts. To releasably hold the tongues in the sockets I provide latch pins 53 carried on leaf springs 54 to normally extend into the sockets 51. The tongues are provided with openings 55 to receive the pins 53 when the rail parts are fully together. To release the rail sections the springs are lifted, disengaging the pins 53 from the openings 55 thus freeing the tongues so they can be withdrawn from the sockets.

The rail sections may be curved or shaped to accommodate the parts of the aeroplane in which they are to fit or the working conditions encountered. For example, I have shown the rail section 36 bent or deflected at 30 so the innermost portion is somewhat higher than the outer end portion. This allows the rail to avoid a part of the plane construction that would otherwise interfere with the rail.

The switch S serves to connect the lateral rail section 37 with the rail sections 35 and 36. A plate 62 carries curved rail segments 63, the outer ends of which are joined to the rail sections 35 and 36 while the inner ends are arranged side by side to cooperate with a shiftable switch member 64. Member 64 has one end carried on a pivot pin 65 adjacent the inner end of a rail part 66 which connects to the lateral rail section 37. Switch part 64 is maintained in working position relative to the rail section 66 and can be shifted into alignment with either of the parts 63. An operating lever 67 is provided for moving the switch part 64.

The apparatus of my invention involves, essentially the rail system above described and supporting means therefor involving the combination of standards and cross-arms whereby the rail system is supported within the aircraft with parts communicating with the exterior thereof without bearing connection with the aircraft itself.

In accordance with the broader principles of the present invention the rail system is supported entirely by standards at the exterior of the aircraft, that is, the rail system is supported by standards 32 which are entirely outside of or at the exterior of the aeroplane itself having no parts whatever extending into or in position to contact any part of the aircraft. I may supplement the preferred supporting means established by the standards 31 of the type which operates through special openings in the fuselage and which is fully set forth and claimed in my said co-pending application. However, for most purposes such supplemental standard 31 will not be necessary when employing the construction of the present invention.

I accomplish support of the rail system within the aircraft by standards 32 located wholly exterior of the aircraft through cross-arms 21 which extend through the fuselage or aeroplane construction by being extended or arranged through the window openings after the frames have been removed. The cross arms 21 are in the form of beams of suitable strength and rigidity made sufficiently long to extend through the fuselage to have an end portion projecting from each side of the fuselage to be engaged by the head of a supporting standard. In Fig. 1 I show a supplemental cross-arm 21ª extending between the standards located at either side of doorway 15 and supporting the rear section 37.

The standards 32 which are provided by my invention are individually shiftable or portable units. Each standard preferably involves a platform 80 carried on supporting wheels 81, a vertically disposed adjusting or operating mechanism 82 projecting upwardly from the platform, and an adjustable post supported by the mechanism 82.

The post may vary widely in construction depending upon operating conditions. In the case illustrated I have shown an adjustable telescoping post construction which involves a lower tubular section 71 adapted to extend into and be supported by the mechanism 82 and an inner or upper section 70 which slidably fits into the upper end of the section 71 and is provided at its upper end with a head 75 for connection with one end of a cross-arm 21. An opening 72 is provided through the section 70 near its upper end and a plurality of openings 73 are provided in the section 70 so that a pin 84 can be arranged through the openings to establish the post at the desired height.

In practice any suitable means may be provided for connecting the head end 75 of the post with the projecting end of a cross-arm 21. In the case illustrated the cross-arm is a downwardly faced channel and the head 75 fits between the sides of the channel and a pin 80ª is arranged through the channel and the head to releasably connect these parts together.

The adjusting mechanism 82 is provided for operating the post vertically and for supporting it at various heights as may be desired. In the drawings I show a hydraulic adjusting means involving a cylinder 75 mounted on the base and a ram 76 operable in the cylinder and provided at its upper end 77 to receive the lower end of the post section 71. A suitable hydraulic operating and control means 78 is provided so that fluid can be introduced into the cylinder 75 below the ram 76 to move the ram upwardly or to be exhausted from below the ram to allow it to descend. The mechanism just described with the control 78 may be in the nature of a jack and any suitable details of construction found in such devices may be used in carrying out my invention.

In the preferred construction the platform 80 of each unit has sockets 70ª and 71ª to receive the post sections 70 and 71 when they are apart so that the several parts of the standard to be arranged in a compact manner on the platform to be conveniently moved from place to place and to be in compact form for storage.

The cross arms 21 serve to support the several sections of the rail system within the fuselage of the aeroplane. In practice any suitable means may be provided for connecting the rail parts with the cross-arms. In the particular case illustrated in Fig. 11 of the drawings suitable brackets are releasably secured to the upper flanges 42 of the rail parts and engage over the cross-arms so that the rail parts are suspended from the cross-arms.

The load handling carriages 33 may vary in size and type and in number, depending upon the working conditions encountered. As an example each carriage may involve a head 88 supported on the lower flange 42 of a rail through rollers 86 and a cargo-carrying hook 87 may be suspended from the head by a cable. The carriage and its wheel support is such that it can be moved freely along and between the several rail sections and through the switch S.

In Fig. 12 of the drawings I show an arrangement wherein the lateral rail section 37 is extended from or beyond the aeroplane to a loading rack P and warehouse X, this section of the rail being supported at various points along its length by standards 32. With this arrangement cargo from the warehouse or the platform can be picked up by a carriage on the rail extension 37 and moved to the desired point in the fuselage of the aeroplane without further handling, or as the aeroplane is being unloaded the cargo can be picked up where it is located in the fuselage of the aeroplane and moved along the rail system to the platform or warehouse, without further handling.

In accordance with my invention I provide an alarm 90 to indicate deflection of the aircraft from a predetermined position due to the application of cargo or the removal of cargo. When the cross-arms 21 are arranged through the side openings in the fuselage A the standards 32 are adjusted so the arms have proper clearance in the openings. As the aeroplane is being loaded and the load accumulates the aeroplane will settle and if care were not exercised a condition may develop where the fuselage lowers so that it establishes bearing engagement with the cross-arms and may cause injury to the aeroplane construction. A similar condition might arise as the aeroplane is being unloaded. In such case, as the cargo is removed the aeroplane will lift or move upwardly and may cause the apparatus to be lifted by the plane so that the load of the cargo instead of being carried by the apparatus through the standards 31 is carried wholly through the aeroplane construction itself.

My invention provides the alarm 90 so that persons handling the apparatus of the present invention will be notified when a dangerous condition, such as I have pointed out above, is about to occur. The alarm 90 involves primarily, a switch to be located at an opening which passes a cross-arm which switch controls a bell 91, or the like. In the case illustrated the bell 91 is an electric bell and the bell and switch are carried on a frame 92 to be secured on a cross-arm 21 by a spring clip 93. The switch involves a control button 94 adapted to be operated by a projecting leaf spring 95. The mechanism is such that when the leaf spring 95 is depressed the part 94 is operated so that the bell is energized.

The frame 92 is applied to a cross-arm at one of the openings in the aeroplane, either on the upper side of the cross-arm or the lower side of the cross-arm, so that as the handling of the cargo varies the condition or relationship of the cross-arm to the opening the switch will be operated before a dangerous condition is established. If the aircraft is being loaded the alarm device 90 above described is located on the upper side of the cross-arm as in that case the cross-arm remains stationary and the aeroplane body or fuselage will move downwardly and when sufficiently lowered or deflected will strike the spring 95 and cause operation of the switch. If the aeroplane is being unloaded the switch 90 is arranged on the under side of the cross-arm so that the spring 95 is actuated when the fuselage moves upwardly approaching a dangerous position relative to the cross-arm. In practice several alarm units may be installed at suitable points.

In employing the apparatus provided by my invention the several parts of each rail section are assembled together in the aircraft with a suitable part or parts projecting at the exterior of the aircraft through the openings such as the doorway 15 and openings 17 and 18. The rail parts within the aircraft are supported by cross-arms 21 through the bracket shown in Fig. 11 and the outer ends of the cross-arms are supported by the standards 32, the standards being adjusted vertically so the cross-arms are supported freely in the openings in the sides of the fuselage. The cargo carriages 3 can then be operated into and out of cargo-carrying compartments as indicated at the nose portion of the aircraft in Fig. 1, or out through the opening 17 on the rail section 36, or from the side of the aircraft along the lateral rail section 37.

It will be apparent that the several standards 32 are located entirely at the exterior of the aircraft, making it unnecessary to position them under the aircraft or assemble them in the aircraft, as is the case of the standard 31 shown in Fig. 1. The only parts of the apparatus within the aircraft itself need be the rail sections and the cross-arms which support them. With the alarm system provided by my invention warning is given when conditions are about to occur that would cause parts of the aircraft to be subjected to strains through engagement with parts of the loading apparatus.

In Fig. 10 I show an arrangement applicable to a fuselage construction having a second floor or deck F¹. In this case windows are provided for the upper and lower sections into which the fuselage is divided by floor F¹. The construction above described can be applied to the upper section while second or lower cross-arms 21 can be carried by heads 75ª located on the posts at suitable heights, as for instance, on the lower sections of the posts, so as to extend through or into the lower section. A second or lower rail system may be thus established in the lower section of the fuselage.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. In combination, an aeroplane having a fuselage with window openings at opposite sides, an arm arranged to extend simultaneously through both of the openings, a rail supported by the arm within the fuselage to extend longitudinally thereof, and standards located wholly at the exterior of the fuselage supporting the arm independently of the fuselage.

2. In combination, an aeroplane having a fuselage with a plurality of pairs of windows in its sides the pairs of windows being spaced apart longitudinally of the fuselage and the windows of each pair being opposite each other transversely of the fuselage, arms arranged transversely through the fuselage to simultaneously project from the windows, a rail arranged longitudinally in the fuselage supported therein entirely by the arms, and standards at the exterior of the fuselage supporting the arms entirely independently of the fuselage.

3. Apparatus for use in connection with the fuselage of an aeroplane having openings in opposite sides including, a cross arm to be arranged through the openings to project simultaneously from opposite sides of the aeroplane, a rail arranged longitudinally within the fuselage supported entirely therein by the arm, and standards for supporting the cross arm by the projecting portions thereof each standard including a supporting structure projecting vertically from a wheel supported platform.

4. In combination, an aeroplane having a fuselage, an arm, means supporting the arm independently of the aeroplane including a standard independent of the aeroplane and located entirely at the exterior of the fuselage, the standard including a supporting structure projecting vertically from a wheel supported platform, and a rail engaged and supported by the arm at a point within the fuselage with a substantially straight portion extending longitudinally of the fuselage.

5. In combination with the fuselage of an aeroplane having openings in opposite sides including, a cross arm to be arranged through the openings to project from opposite sides of the aeroplane, an alarm carried by the arm to be operated by deflection of the aeroplane relative to the arm, and standards for supporting the cross arm by the projecting portions thereof.

6. In combination with the fuselage of an aeroplane having openings in opposite sides including, a cross arm to be arranged through the openings to project from opposite sides of the aeroplane, a rail supported by the arm to extend longitudinally in the fuselage and standards for supporting the cross arm by the projecting portions thereof, each standard including an adjusting mechanism and a sectional post detachably supported by the mechanism to project vertically therefrom and engage the arm.

7. In combination with the fuselage of an aeroplane having pairs of openings in its sides at different elevations, arms arranged through the openings to be at different elevations, rails supported by the arms to be at different elevations, and a single pair of standards supporting the arms.

GEORGE O. NOVILLE.

REFERENCES CITED

The following references are of record in the file of this patent:

UNITED STATES PATENTS

| Number | Name | Date |
|---|---|---|
| 1,147,128 | Troll | July 20, 1915 |
| 1,168,370 | Anderson | Jan. 18, 1916 |
| 1,395,749 | Thorn | Nov. 1, 1921 |
| 1,406,656 | Knight | Feb. 14, 1922 |
| 1,737,514 | Nikolish | Nov. 26, 1929 |
| 2,322,636 | Kidder | June 22, 1943 |

OTHER REFERENCES

"Scientific American," volume CXXIII, No. 15, October 20, 1920, page 371.